United States Patent

Hodgson et al.

(10) Patent No.: US 9,151,199 B2
(45) Date of Patent: Oct. 6, 2015

(54) METHOD FOR OPERATING AN EXHAUST-GAS TREATMENT DEVICE AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Jan Hodgson, Troisdorf (DE); Joerg-Roman Konieczny, Much (DE); Rolf Brueck, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 255 days.

(21) Appl. No.: 13/632,487

(22) Filed: Oct. 1, 2012

(65) Prior Publication Data

US 2013/0255235 A1    Oct. 3, 2013

Related U.S. Application Data

(63) Continuation of application No. PCT/EP2011/054309, filed on Mar. 22, 2011.

(30) Foreign Application Priority Data

Apr. 1, 2010    (DE) .......................... 10 2010 013 696

(51) Int. Cl.
*F01N 3/00* (2006.01)
*F01N 3/18* (2006.01)
(Continued)

(52) U.S. Cl.
CPC .............. *F01N 3/18* (2013.01); *B01D 53/9495* (2013.01); *F01N 3/0871* (2013.01);
(Continued)

(58) Field of Classification Search
CPC .............. B01D 53/9495; F01N 13/009; F01N 13/0097; F01N 3/0871; F01N 3/0878; F01N 3/103; F01N 3/18; F01N 3/2013; F01N 3/208; F01N 2240/16; F01N 2240/40; F01N 2510/06; F01N 2570/18; F01N 2610/02; F01N 2610/10; Y02T 10/24; Y02T 10/26
USPC ........................... 60/274, 286, 295, 301, 303
See application file for complete search history.

(56) References Cited

U.S. PATENT DOCUMENTS 5,785,937 A    7/1998  Neufert et al.
6,125,629 A *  10/2000  Patchett .......................... 60/286
(Continued)

FOREIGN PATENT DOCUMENTS

CN         101265825 A       9/2008
DE    10 2006 041 135 A1    3/2007
(Continued)

OTHER PUBLICATIONS

International Search Report of PCT/EP2011/054309 Dated Aug. 11, 2011.

*Primary Examiner* — Thomas Denion
*Assistant Examiner* — Matthew T Largi
(74) *Attorney, Agent, or Firm* — Laurence A. Greenberg; Werner H. Stemer; Ralph E. Locher

(57) ABSTRACT

A method for operating an exhaust gas treatment device having at least one heater and at least one supply device for a reducing agent includes initially carrying out a test in order to determine if the reducing agent is to be supplied, and subsequently implementing different heating strategies in each case. In the event that the reducing agent is to be supplied, the exhaust gas treatment device is heated with the heater until a first threshold temperature is reached, if a first temperature lies below the first threshold temperature. In the case when no reducing agent is to be fed, the exhaust gas treatment device is heated with the heater until a second threshold temperature is reached, if a second temperature lies below the second threshold temperature. A motor vehicle having the device is also provided.

7 Claims, 3 Drawing Sheets

(51) Int. Cl.
*F01N 3/08* (2006.01)
*F01N 3/10* (2006.01)
*F01N 3/20* (2006.01)
*B01D 53/94* (2006.01)
*F01N 13/00* (2010.01)

(52) U.S. Cl.
CPC ............. *F01N 3/0878* (2013.01); *F01N 3/103* (2013.01); *F01N 3/208* (2013.01); *F01N 3/2013* (2013.01); *F01N 13/009* (2014.06); *F01N 13/0097* (2014.06); *F01N 2240/16* (2013.01); *F01N 2240/40* (2013.01); *F01N 2510/06* (2013.01); *F01N 2570/18* (2013.01); *F01N 2610/02* (2013.01); *F01N 2610/10* (2013.01); *Y02T 10/24* (2013.01); *Y02T 10/26* (2013.01)

(56) References Cited

U.S. PATENT DOCUMENTS

| | | | |
|---|---|---|---|
| 6,895,747 B2 * | 5/2005 | Upadhyay et al. | 60/286 |
| 7,431,895 B2 | 10/2008 | Pfeifer et al. | |
| 7,818,960 B2 | 10/2010 | Gonze et al. | |
| 8,356,470 B2 | 1/2013 | Nagaoka et al. | |
| 2004/0098979 A1 | 5/2004 | Hammerle et al. | |
| 2007/0044456 A1 | 3/2007 | Upadhyay et al. | |
| 2008/0223019 A1 * | 9/2008 | Gonze et al. | 60/286 |
| 2009/0133389 A1 | 5/2009 | Shimomura et al. | |
| 2010/0057328 A1 * | 3/2010 | Brown et al. | 701/103 |
| 2011/0000189 A1 | 1/2011 | Mussmann et al. | |

FOREIGN PATENT DOCUMENTS

| | | | | |
|---|---|---|---|---|
| DE | 102007006625 | A1 | 8/2008 | |
| DE | 102008043895 | A1 | 5/2009 | |
| DE | 10 2007 060 623 | A1 | 6/2009 | |
| EP | 0775013 | B1 | 8/1998 | |
| JP | H0626332 | A | 2/1994 | |
| JP | 2002200413 | A | 7/2002 | |
| JP | 2004257325 | A | 9/2004 | |
| JP | 2005214175 | A | 8/2005 | |
| JP | 2006002662 | A | 1/2006 | |
| JP | 2006212591 | A | 8/2006 | |
| JP | 2008286102 | A | 11/2008 | |
| JP | 2009174380 | A | 8/2009 | |
| WO | 2005064130 | A1 | 7/2005 | |
| WO | WO 2005064130 | A1 * | 7/2005 | F01N 3/20 |
| WO | 20051073528 | A1 | 8/2005 | |
| WO | WO 2005073528 | A1 * | 8/2005 | F01N 3/24 |

* cited by examiner

METHOD FOR OPERATING AN EXHAUST-GAS TREATMENT DEVICE AND MOTOR VEHICLE HAVING THE DEVICE

CROSS-REFERENCE TO RELATED APPLICATION

This is a continuation, under 35 U.S.C. §120, of copending International Application No. PCT/EP2011/054309, filed Mar. 22, 2011, which designated the United States; this application also claims the priority, under 35 U.S.C. §119, of German Patent Application DE 10 2010 013 696.4, filed Apr. 1, 2010; the prior applications are herewith incorporated by reference in their entirety.

BACKGROUND OF THE INVENTION

Field of the Invention

The invention relates to a method for operating an exhaust-gas treatment device for an internal combustion engine, having at least one heater and at least one supply device for a reducing agent. The invention also relates to a motor vehicle having the device.

Exhaust-gas treatment devices have long been used in order to reduce the pollutants in the exhaust gases of internal combustion engines. Exhaust-gas treatment devices with a supply for a reducing agent have for some time been common for effectively reducing pollutants in the exhaust gas of an internal combustion engine. It has been found that, in particular in the case of lean-burn internal combustion engines, it can be advantageous to supply a reducing agent to the exhaust gas. In particular, the fraction of nitrogen oxide compounds ($NO_x$) in the exhaust gas is increased in the case of lean-burn internal combustion engines, and can be reduced in an exhaust-gas treatment device in conjunction with a reducing agent. That is referred to as the method of selective catalytic reduction (SCR method).

Ammonia may be used, for example, as a reducing agent. Ammonia is converted with the nitrogen oxide compounds in the exhaust gas to form non-harmful constituents, specifically nitrogen, water and carbon dioxide. Ammonia is normally not stored in direct form in a motor vehicle. A reducing agent precursor which is converted into the actual reducing agent according to demand is normally stored and/or supplied. Urea, for example, may serve as such a reducing agent precursor. An aqueous urea solution is particularly preferable. An aqueous urea solution of that type with a urea content of 32.5% is available, for example, under the trademark AdBlue®.

A reducing agent can be supplied to an exhaust-gas treatment device of an internal combustion engine in liquid and/or gaseous form. A reducing agent is normally stored in a motor vehicle in liquid form. Such liquid storage is possible in a particularly space-saving manner. Liquid reducing agent must usually firstly be evaporated before it can be supplied to an exhaust-gas treatment device in gaseous form. If liquid reducing agent is supplied, the evaporation of the reducing agent must take place in the exhaust-gas treatment device. Adequately high exhaust-gas temperatures are required for that purpose.

Lean-burn internal combustion engines are operated with an air/fuel ratio in which more air is supplied than is required for the complete conversion of the supplied fuel. Such internal combustion engines are, in particular, modern diesel engines. In such internal combustion engines, however, particularly low exhaust-gas temperatures are often present. In the case of a supply of liquid reducing agent to the exhaust gas, the reducing agent cools the exhaust gas down further still. The liquid reducing agent is normally evaporated in the exhaust gas. In that case, the evaporation energy of the reducing agent is extracted from the exhaust gas.

The conversion of the pollutants in an exhaust-gas treatment device is dependent primarily also on the temperature of the exhaust gases. Most of the conversion processes of pollutants such as, for example, nitrogen oxide, carbon monoxide or soot particles (carbon particles) take place substantially more quickly at high exhaust-gas temperatures than at low exhaust-gas temperatures. Below specific threshold temperatures, which vary for different conversion processes, certain conversion processes no longer take place at all.

For that reason, in particular in the case of exhaust-gas treatment devices for lean-burn internal combustion engines, it is known to provide exhaust-gas heaters in the exhaust-gas treatment devices. Exhaust-gas heaters were originally developed to heat up the exhaust system quickly during the cold start of an internal combustion engine. Such exhaust-gas heaters may be provided, for example, in the form of heating coils which are mounted in the exhaust line. However, electrically heatable honeycomb bodies in which an electrical current flows through packs of multiple at least partially structured metallic foils are also known from the prior art. Such electrically heatable honeycomb bodies have the advantage that they have a significantly larger surface through which they can discharge the generated heat to the exhaust gas.

The operation of such electrically heatable honeycomb bodies must be initiated in a targeted manner, because they consume electrical current. Strategies are therefore required by which an electric heater in an exhaust system can be operated in such a way that it firstly contributes to the advantageous conversion of the exhaust gases in the exhaust-gas treatment device and secondly has the lowest energy consumption possible.

SUMMARY OF THE INVENTION

It is accordingly an object of the invention to provide a method for operating an exhaust-gas treatment device having at least one heater and at least one supply device for a reducing agent and a motor vehicle having the device, which overcome the hereinafore-mentioned disadvantages and further alleviate the highlighted technical problems of the heretofore-known devices and vehicles of this general type.

With the foregoing and other objects in view there is provided, in accordance with the invention, a method for operating an exhaust-gas treatment device having at least one heater and at least one supply device for a reducing agent. The method comprises at least the following steps:
  a) checking if reducing agent should be supplied;
  b) b.1) heating with the heater until a first threshold temperature is reached, if a determined first temperature lies below the first threshold temperature and if, according to step a), reducing agent should be supplied;
  c) b.2) heating with the heater until a second threshold temperature is reached, if a determined second temperature lies below the second threshold temperature and if, according to step a), no reducing agent should be supplied; and
  d) supplying reducing agent if, according to step a), reducing agent should be supplied.

The individual method steps of the method according to the invention are normally repeated iteratively in the manner of a loop, in the sequence specified herein, during the operation of an internal combustion engine.

The expression "reducing agent" is used herein as an all-encompassing term both for a reducing agent and also for a reducing agent precursor such as, for example, urea or aqueous urea solution.

The method according to the invention is distinguished in that it provides or sets two different threshold temperatures for the control of the heater in the exhaust-gas treatment device. Different conversion processes which take place in an exhaust-gas treatment device require different minimum temperatures above which the conversion processes take place. It has been found that higher temperatures are regularly required, in particular, during the supply of liquid reducing agent into the exhaust-gas treatment device than when no reducing agent is supplied. For this reason, a heater in an exhaust-gas treatment device may be operated in a particularly energy-saving manner with different threshold temperatures without the effectiveness of the exhaust-gas treatment device with regard to the conversion of pollutants in the exhaust gas being impaired. The temperature/threshold temperature may be the temperature of the exhaust gas and/or the temperature of a component which is in contact with the exhaust gas. The temperature may be measured on an ongoing basis and/or may be calculated. The threshold temperatures may be stored as fixed values and/or calculated or adapted (on an ongoing basis).

A temperature is to be considered "determined," in particular, if it is calculated, predicted and/or measured (immediately before and/or after and/or closely in terms of time) characteristically of a present state.

In other words, step b.1) includes, in particular, the following process: a characteristic "first temperature" is firstly determined, wherein the first temperature is characteristic, in particular, of at least the present heat state in/on the exhaust-gas treatment device, the feed device, the exhaust-gas flow and/or the reducing agent. A comparison of the first temperature thus determined with a "first threshold value" assigned to the process then takes place. The "first threshold value" is for example calculated, predefined or read out from a data memory (on an ongoing basis and/or closely in terms of time). If the comparison yields that the first temperature lies below the first threshold value and metering of reducing agent should take place, the heater is activated until the first threshold value is reached for the characteristic first temperature (relating to the same location, medium, etc. as specified above).

With regard to the generation of the "second temperature" and the execution of the comparison with a second threshold value according to step b.2), that which has been stated above preferably applies correspondingly.

It is possible for the first temperature and the second temperature to be monitored and determined through the use of a common sensor. If the same measurement locations, references, objects, etc. are involved in steps b.1) and b.2), then there is practically no difference between the first temperature and the second temperature, and it is then possible for an equivalent designation ("the" temperature) to be used for simplicity. This, however, need not apply to the corresponding threshold temperatures, which may therefore deviate from one another in this case too.

It is also possible for the first temperature and the second temperature to be monitored and determined through the use of two different sensors. Furthermore, separate monitoring of the two temperatures may be provided, wherein the determination of the first temperature and the determination of the second temperature take place at different locations in the exhaust system. The conversion of the reducing agent, for which the first temperature is significant, and the conversion of the pollutants in the exhaust gas, for which the second temperature is significant, may take place at different locations in the exhaust system. The conversion of the reducing agent generally takes place where a correspondingly active catalytic converter is provided. The conversion of the pollutants in the exhaust gas likewise generally takes place where a correspondingly active catalytic converter is provided. The monitoring of the respective temperatures should accordingly be performed at these locations in each case.

It is likewise possible for joint monitoring of the first temperature and of the second temperature to take place. This is advantageous, in particular, if the conversion of the reducing agent and the conversion of the pollutants in the exhaust gas take place spatially in very close succession in the exhaust-gas treatment device. The determination of the first temperature and of the second temperature then takes place preferably at a location in the exhaust system with a common temperature sensor. The first temperature then corresponds to the second temperature.

For illustration of the method, it is also mentioned that steps b.1) and b.2) are carried out alternatively as a function of the result of the check in step a). This also means, in other words, that if reducing agent should be added, the following steps are carried out: b.1) and c), wherein heating takes place only if the first threshold temperature is undershot. If no reducing agent should be added, (only) step b.2) is carried out if the second threshold temperature is undershot.

In accordance with another advantageous mode of the method of the invention, the first threshold temperature is selected in such a way that at least a hydrolysis in a hydrolysis catalytic converter, a thermolysis or an evaporation of liquid reducing agent can take place if the first temperature lies above the first threshold temperature. If appropriate, the first threshold temperature may be selected in such a way that a plurality of the stated processes in the exhaust system are initiated.

As already stated, elevated temperatures are regularly required during the supply of reducing agent. This is because the supplied reducing agent or the supplied reducing agent precursor must regularly be converted into the final reducing agent. A urea-water solution, which must be converted into ammonia in the exhaust system is used, by way of example, as a reducing agent precursor. Different chemical processes may take place for converting the reducing agent. One of the processes is hydrolysis in a hydrolysis catalytic converter. In this case, the reducing agent is converted into ammonia under the influence of a catalytically acting hydrolysis coating. Temperatures in the exhaust gas of approximately 200° C. are necessary for this purpose.

The temperature required for the hydrolysis of a urea-water solution may possibly also be lowered by the presence of ammonia [$NH_3$] and nitrogen dioxide [$NO_2$]. It is then possibly the case that temperatures of between only 130° C. and 160° C. are necessary for hydrolysis.

A further chemical process which can lead to the conversion of the reducing agent is thermolysis. Thermolysis is the purely thermal conversion of reducing agent or reducing agent precursor to form the final reducing agent, without the influence of a catalytically active hydrolysis coating. Only approximately 50% of a 32.5% urea-water solution used as a reducing agent precursor is converted into ammonia. The other 50% of the urea-water solution is converted into isocyanic acid (HNCO). The temperature required for the thermolysis of reducing agent is generally higher than the temperature required for hydrolysis. There is no clear threshold temperature for the commencement of the thermolysis of the reducing agent precursor. Thermolysis takes place simultaneously with hydrolysis of reducing agent over a wide temperature range.

Furthermore, the first threshold temperature may be selected so as to ensure that liquid reducing agent evaporates. This method implementation is advantageous, in particular, if a reducing agent need not be chemically converted in order to be effective in the exhaust-gas treatment device, but rather need merely be changed from the liquid state of aggregation into the gaseous state of aggregation. In the case of reducing agent precursors such as, for example, urea-water solution as well, an at least partial conversion by thermolysis and/or hydrolysis also already takes place in parallel with the evaporation.

In accordance with these explanations, it is expedient for the first threshold temperature to be selected in such a way that at least one of the processes of hydrolysis, thermolysis or evaporation of liquid reducing agent can take place. Accordingly, in particular the following first threshold temperatures are proposed:

first threshold temperature_evaporation: greater than 160° C. and up to 240° C. in the exhaust gas at the supply point,
first threshold temperature_hydrolysis: greater than 160° C. and up to 240° C. at the hydrolysis catalytic converter,
first threshold temperature_hydrolysis (in the presence of $NH_3$ and $NO_2$): between 130° C. and 160° C. at the hydrolysis catalytic converter.

In accordance with a further advantageous mode of the method of the invention, the second threshold temperature is selected in such a way that a selective catalytic reduction of nitrogen oxide compounds in an SCR catalytic converter can take place if the second temperature lies above the second threshold temperature. The second threshold temperature is provided for the regular operation of the exhaust-gas treatment device. During regular operation of an exhaust-gas treatment device with a supply device for a reducing agent, the selective catalytic conversion of nitrogen oxide compounds with the reducing agent normally takes place permanently. It is expedient in this case for the second threshold temperature to be selected in such a way that the reactions necessary for this purpose can take place without problems. The second threshold temperature may in this case be, for example, between 130° C. and 160° C. at the SCR catalytic converter.

Accordingly, it is particularly preferable if, in step b.1), a first temperature of greater than 160° C., for example approximately 180° C., approximately 200° C. or even at least 240° C. is set if reducing agent should be added. If no addition of reducing agent is planned, it is accordingly possible, corresponding to step b.2), for regulation to be performed to the second temperature in the range from 130° C. to 160° C.

In accordance with an added advantageous mode of the method of the invention, the heater is activated only if at least the first temperature or the second temperature and the exhaust-gas mass flow passing through the exhaust-gas treatment device lie in a range such that at least the first threshold temperature or the second threshold temperature can be attained through the use of the heater.

An electric heater provided in an exhaust-gas treatment device generally has only a limited power capacity. The power capacity may be between for example 500 and 5000 Watts. With such a level of electrical power, it is not possible to realize any desired magnitude of temperature increase in an exhaust-gas flow. The possible temperature increase in the exhaust-gas flow is dependent firstly on the exhaust-gas temperature already prevailing in the exhaust-gas flow and secondly on the mass flow rate of the exhaust gas. The higher the exhaust-gas mass flow, the greater the amount of energy that must be introduced into the exhaust-gas mass flow in order to achieve a certain temperature increase. For this reason, it may be the case that, proceeding from a certain prevailing first temperature or second temperature, it is uneconomical or even impossible to attain the corresponding first threshold temperature or the corresponding second threshold temperature. It may therefore be advantageous to dispense with heating of the exhaust gas if such situations are present. With the termination condition specified in this case for the method, an unnecessary use of heating energy can be prevented.

In accordance with an additional mode of the method of the invention, the exhaust-gas treatment device has a storage device in which a quantity of reducing agent can be temporarily stored. A storage device for temporarily storing a quantity of reducing agent may, for example, be a storage coating on a substrate with which the exhaust gas comes into contact. The coating is capable of storing ammonia, in particular, in a certain temperature range. Such a storage device may also be provided in a honeycomb body together with the coating provided for selective catalytic reduction. This is also possible in the form of a mixed coating which has both ammonia-storing constituents and also constituents which assist the selective catalytic reduction. Such a storage device is preferably capable of storing, for example, for an operating period of between one minute and one hour, preferably between 5 minutes and 30 minutes, a quantity of reducing agent sufficient to allow the selective catalytic reduction in the exhaust-gas treatment device to take place without a renewed supply of reducing agent.

Through the use of such temporary storage of reducing agent in the exhaust-gas treatment device, it can be achieved that particularly expedient times can be used for the supply of reducing agent.

In accordance with yet another advantageous mode of the method of the invention, firstly the quantity of reducing agent stored in the storage device is determined, and in step a) it is established that a supply of reducing agent should take place if the stored quantity of reducing agent lies below a minimum storage quantity.

The quantity of reducing agent stored in a storage device may be determined and/or calculated through the use of suitable sensors. The stored quantity may be measured, for example, through the use of a capacitive sensor which is embedded in the storage device and has a capacitance which varies as a function of the stored quantity of reducing agent.

In accordance with yet a further advantageous mode of the method of the invention, the supply device for reducing agent in the exhaust-gas treatment device can supply the reducing agent selectively in liquid or gaseous form, and in step a), it is also checked if the first threshold temperature can be attained through the use of the heater, and in step c), a gaseous supply is provided if the first threshold temperature cannot be reached. The gaseous supply of reducing agent preferably takes place if the minimum storage quantity of reducing agent in a storage device would be undershot without the gaseous supply, or has already been undershot.

The gaseous supply of reducing agent requires additional energy for the evaporation of the reducing agent. On the other hand, through the supply of gaseous reducing agent, it is possible to realize a particularly fast provision of reducing agent in the exhaust-gas treatment device. Gaseous reducing agent is firstly converted very quickly into the final reducing agent (for example ammonia) because the energy required for conversion is already present in the gaseous reducing agent in the form of heat. Secondly, gaseous reducing agent also passes very quickly into the SCR catalytic converter and cannot accumulate in the form of droplets on the exhaust line. Reducing agent or reducing agent precursor can also already be converted into the final reducing agent before being supplied. This may be realized by hydrolysis or thermolysis.

If a gaseous supply of reducing agent is possible, for example through heating of the reducing agent outside the exhaust gas in a separate evaporator, it can be ensured that, despite particularly low temperatures in the exhaust system, the selective catalytic reduction in the SCR catalytic converter can take place efficiently and reliably over a long period of time.

In accordance with yet an added advantageous mode of the method of the invention, in step a), a third temperature in the exhaust-gas treatment device is determined, and it is furthermore established that a supply of reducing agent should take place if the third temperature in the exhaust-gas treatment device exceeds a third threshold temperature. The third temperature, too, may correspond to the first temperature and/or the second temperature (that is to say relate to the same location in the exhaust-gas treatment device) and if appropriate be determined through the use of the same temperature sensor as the first temperature and/or the second temperature.

It is now proposed in this case that the supply of reducing agent be initiated not only if a minimum storage quantity is undershot in a storage device in which reducing agent can be temporarily stored but rather also if the possibility of a particularly energy-saving supply of reducing agent arises due to the attainment of a particularly high third temperature in the exhaust-gas treatment device. The third temperature is preferably selected in such a way that the heater need not be used at all for the supply of reducing agent. A storage device, provided in the exhaust-gas treatment device, for reducing agent can thus be filled in a particularly energy-saving manner. The necessary heating power for the heater is reduced through the selection of suitable heating times and supply times at which elevated temperatures prevail in any case.

In accordance with yet an additional advantageous mode of the method of the invention, the time segment during which a supply of reducing agent takes place amounts to at most 25% of the overall operating time of the internal combustion engine. The time segment preferably amounts to even at most 10% of the overall operating time of the internal combustion engine or even at most 5%. If a storage device in the exhaust-gas treatment device ensures that reducing agent is temporarily stored for an adequate operating time period, it is possible for particular operating phases of the internal combustion engine with particularly elevated exhaust-gas temperature, for example acceleration phases of the motor vehicle, to be used for supplying the necessary reducing agent for the SCR catalytic converter.

With the objects of the invention in view, there is concomitantly provided a motor vehicle, comprising an internal combustion engine and an exhaust-gas treatment device, having a heater, a supply device for a reducing agent and a control unit. The control unit is set up, configured or programmed for carrying out the method according to the invention. The method according to the invention may be realized, for example, in the form of software in the engine controller of a motor vehicle, which communicates with sensors and/or operates the heater in a corresponding way.

Other features which are considered as characteristic for the invention are set forth in the appended claims, noting that the features specified individually in the claims may be combined with one another in any desired technologically meaningful way and may be supplemented by explanatory facts from the description, with further structural variants of the invention being highlighted.

Although the invention is illustrated and described herein as embodied in a method for operating an exhaust-gas treatment device and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
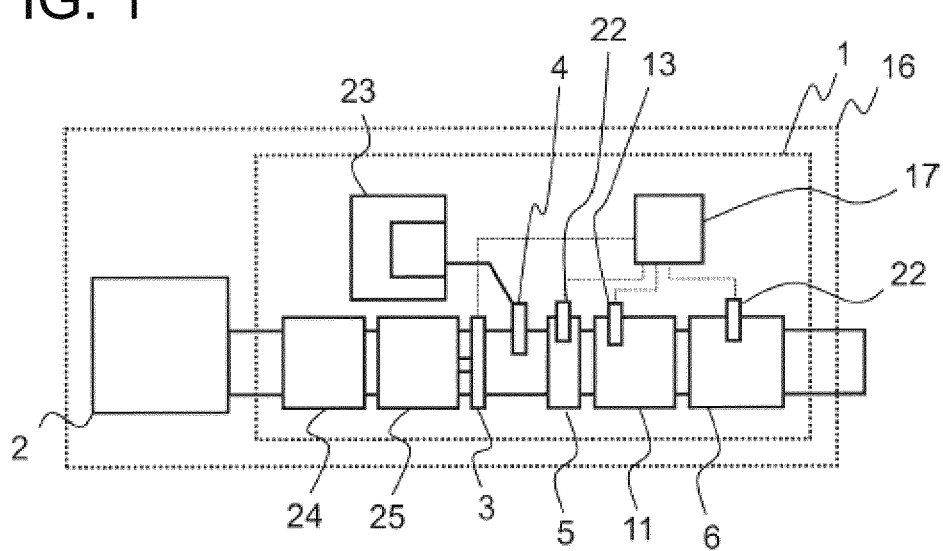
FIG. 1 is a diagrammatic, sectional view of a motor vehicle having an exhaust-gas treatment device which is set up or configured for carrying out the method according to the invention.

Referring now in detail to the figures of the drawing for explaining the invention and the technical field in more detail by showing particularly preferred structural variants to which the invention is not restricted and noting that the figures are diagrammatic and identical components are denoted by the same reference numerals and first, particularly, to FIG. 1 thereof, there is seen a motor vehicle 16 having an internal combustion engine 2 and an exhaust-gas treatment device 1 which is connected to the internal combustion engine 2. The exhaust-gas treatment device 1 has, in series, an oxidation catalytic converter 24, a particle filter 25, a heater 3, a supply or feed device 4 for reducing agent (for example urea), a hydrolysis catalytic converter 5, a storage device 11 and an SCR catalytic converter 6. A temperature sensor 22 is provided in the SCR catalytic converter 6. A temperature sensor 22 is likewise provided in the hydrolysis catalytic converter 5. The storage device 11 contains a nitrogen sensor 13 through which the loading of the storage device 11 with reducing agent can be monitored. The supply or feed device 4 is supplied with reducing agent through a line from a reducing agent dosing system 23. The heater 3 is controlled by a control unit 17 as a function of data determined by the temperature sensors 22 and the nitrogen sensor 13. The oxidation catalytic converter 24 and the particle filter 25 serve for the pre-treatment of the exhaust gases of the internal combustion engine 2. If appropriate, the supply device 4 may also be disposed upstream of the particle filter 25 and/or the oxidation catalytic converter 24 proceeding from the internal combustion engine 2. The heater 3 may also be disposed upstream of the particle filter 25 and/or the oxidation catalytic converter 24 as viewed in the exhaust-gas flow direction.

Figure 2:
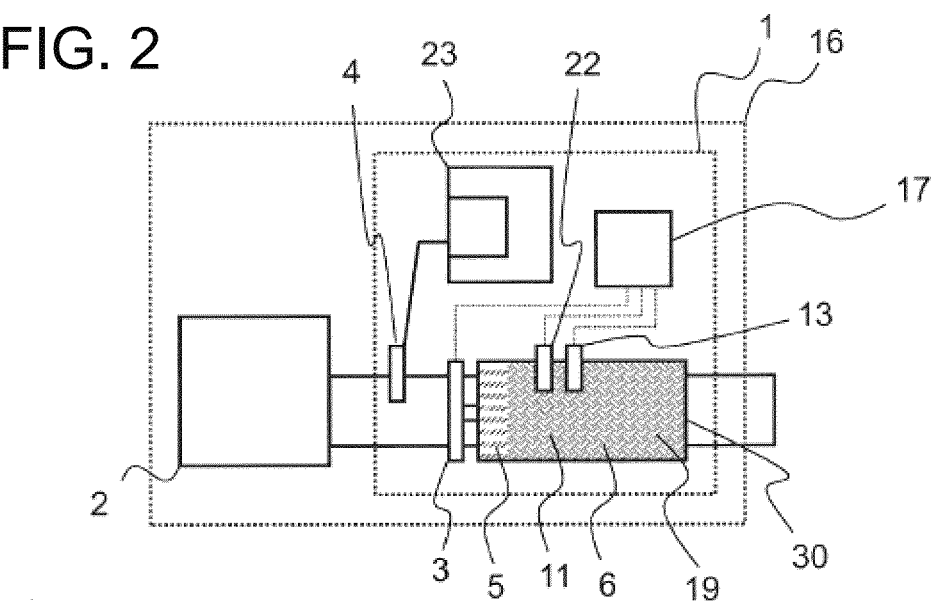
FIG. 2 is a sectional view of a further motor vehicle having an alternative exhaust-gas treatment device which is set up or configured for carrying out the method according to the invention.

FIG. 2 likewise shows a motor vehicle 16 having an internal combustion engine 2 and an exhaust-gas treatment device 1. Proceeding from the internal combustion engine 2, the exhaust-gas treatment device 1 contains, in series, firstly a supply device 4 for a reducing agent which is supplied with reducing agent by a reducing agent dosing system 23. The supply device 4 is followed by a heater 3 and an exhaust-gas treatment component 30. Various functions are realized jointly in the exhaust-gas treatment component 30. The exhaust-gas treatment component 30 includes a hydrolysis catalytic converter 5, a storage device 11 for a reducing agent and an SCR catalytic converter 6. The SCR catalytic converter 6 and the storage device 11 are realized in a common coating 19. The coating 19 includes constituents which store reducing agent and which form the storage device 11, and constituents which promote the selective catalytic reduction and which form the SCR catalytic converter 6. A temperature sensor 22 and a nitrogen sensor 13 are provided in the exhaust-gas treatment component 30. The loading of the storage device 11 with reducing agent can be determined through the use of the nitrogen sensor 13. The heater 3 is controlled by the control unit 17 as a function of data determined by the temperature sensor 22 and the nitrogen sensor 13.

Figure 3:
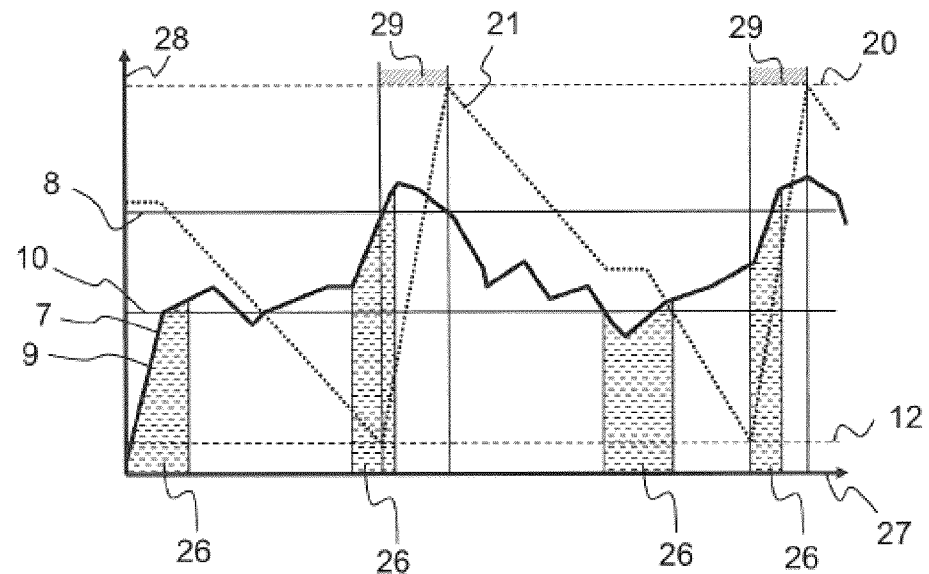
FIG. 3 is a diagram showing exhaust-gas temperatures during operation of the method according to the invention with a first method implementation.
Figure 4:
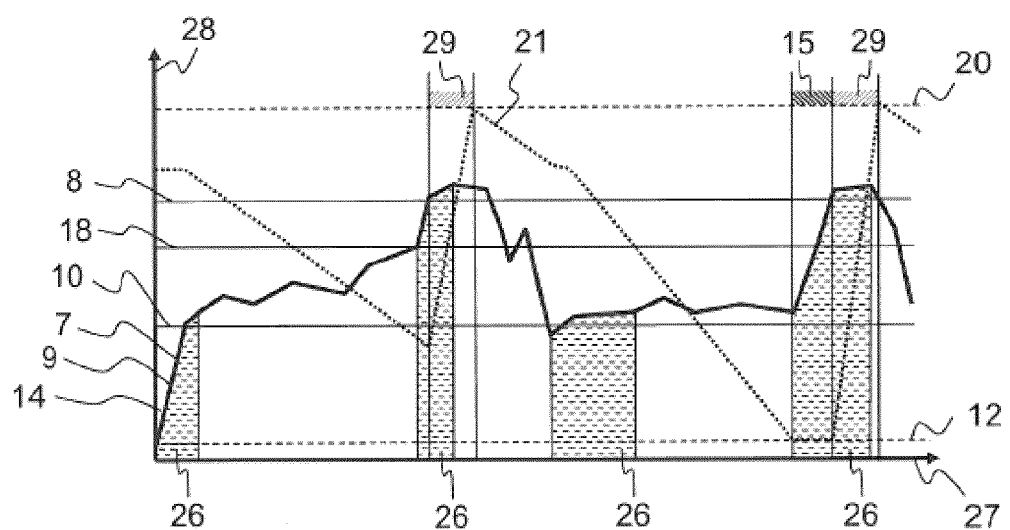
FIG. 4 is a further diagram showing exhaust-gas temperatures during operation of the method according to the invention with a second method implementation.

FIGS. 3 and 4 in each case show diagrams of the temperature in an exhaust-gas treatment device during the progression of the method according to the invention. Since FIGS. 3 and 4 have numerous features in common, they will firstly be explained jointly herein. In the two figures, profiles of a first temperature 7 and of a second temperature 9 in an exhaust-gas treatment device are plotted against a time axis 27. The value of the first temperature 7 and of the second temperature 9 can be read off from a temperature axis 28. The first temperature 7 and the second temperature 9 correspond in this case. In FIG. 4, an additionally monitored third temperature 14 also corresponds to the first temperature 7 and the second temperature 9. The temperatures illustrated therein have been determined, for example, through the use of a common temperature sensor. A loading 21 of a storage device for reducing agent in the exhaust-gas treatment device is indicated in each case by dashed lines in the background. A first threshold temperature 8 and a second threshold temperature 10 are also illustrated in each case as horizontal lines.

At the start (at the left in the diagrams), the first temperature 7 and the second temperature 9 are in each case very low. This may, for example, be attributed to the start of operation of an internal combustion engine. The exhaust-gas treatment device is still cold in this case, and must firstly be heated. In order to increase the first temperature 7 and the second temperature 9 above a predefined second threshold temperature 10, a heating process 26 takes place. When the second temperature 9 has reached the second threshold temperature 10, the internal combustion engine is operated without further heating. The SCR catalytic converter now converts pollutants in the exhaust gas with reducing agent. This can also be seen from the fact that the loading 21 of a storage device with reducing agent falls continuously. When the loading 21 reaches a minimum storage quantity 12, a heating process 26 is initiated again. The minimum storage quantity 12 is indicated as a dashed horizontal line. This corresponds to method step a), in which it is established that a supply of reducing agent should take place. When the first temperature 7 has been raised to a value above the first threshold temperature 8 by the heating process 26, a liquid supply 29 of reducing agent is provided until the loading 21 of the storage device reaches a maximum storage quantity 20. The maximum storage quantity 20 is likewise indicated as a dashed horizontal line. When the maximum storage quantity 20 has been reached, regular operation of the exhaust-gas treatment device, in which the second threshold temperature 10 is significant, is resumed. The second temperature 9 should now again not fall below the second threshold temperature 10. Should this nevertheless occur, a heating process 26 is initiated again. This can also be seen in FIG. 3 and FIG. 4 in that, after the first liquid supply 29, a further heating process 26 is illustrated, during which the loading of the storage device with reducing agent remains constant. This indicates that the second temperature 9 has fallen below the second threshold temperature 10 and there would be the risk that selective catalytic reduction can no longer take place in the exhaust-gas treatment device. When the loading 21 of the storage device has reached the minimum storage quantity 12 again, or threatens to undershoot the minimum storage quantity, a heating process 26 of the exhaust-gas treatment device takes place again, in such a way that the first temperature 7 reaches the first threshold temperature 8. A liquid supply 29 of reducing agent is then initiated again.

FIG. 4 also shows a number of special operating modes of the method according to the invention. In this case, the liquid supply 29 takes place not only when the loading 21 of the storage device for reducing agent has reached or undershot the minimum storage quantity 12. In fact, the liquid supply 29 is initiated in this case as a result of a third temperature 14 of the exhaust gases reaching a third threshold temperature 18. In this case, the third temperature 14 corresponds to the first temperature 7 and the second temperature 9. Particularly energy-efficient filling of the storage device for reducing agent can be achieved in this way. A gaseous supply 15 is also shown before the second liquid supply 29 in FIG. 4. The gaseous supply 15 of reducing agent is initiated in this case because firstly the loading 21 of a storage device for reducing agent in the exhaust-gas treatment device is so low that there would be the risk that complete selective catalytic reduction can no longer take place, and at the same time the first temperature 7 is so low that fast loading of the storage device through the use of a liquid supply 29 is not possible. This can, however, be compensated by the gaseous supply 15. When the first temperature 7 has reached the first threshold temperature 8 as a result of the heating process 26 which is taking place in parallel, a liquid supply 29 of reducing agent takes place again, through the use of which the loading 21 of a storage device for a reducing agent in the exhaust-gas treatment device can be filled up again.

In this case, the gaseous supply 15 of reducing agent is resorted to, for example, only if reliable operation of the SCR catalytic converter cannot be ensured with reducing agent from a storage device in the exhaust-gas treatment device and/or with reducing agent supplied in liquid form.

Figure 5:
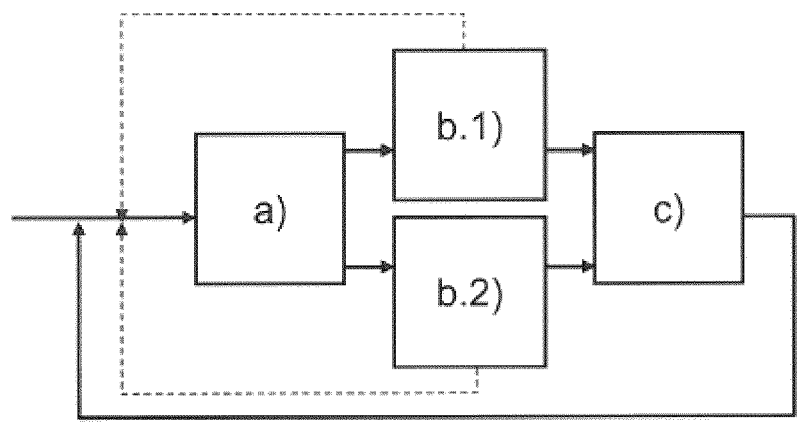
FIG. 5 is a block diagram illustrating a progression of the method according to the invention.

FIG. 5 shows a flow diagram of the method according to the invention. FIG. 5 illustrates method steps a), b1), b2) and c). It can also be seen that the method according to the invention is carried out repeatedly in the manner of a loop. Step b.1) or step b.2) is initiated alternatively in accordance with a determination in step a) as to whether or not a supply of reducing agent should take place. It is likewise indicated by dashed arrows that, if the present temperature at least corresponds to the threshold temperature, step c) (heating) is bypassed. The method may basically be re-started after a time delay and/or on demand.

The invention claimed is:

1. A method for operating an exhaust-gas treatment device, the method comprising the following steps:

providing a storage device for temporarily storing a quantity of reducing agent, a hydrolysis catalytic converter, an SCR catalytic converter, at least one heater and at least one supply device for a reducing agent;

a) checking if reducing agent should be supplied;

b.1) heating exhaust gas upstream of the exhaust gas treatment device with the heater until a first threshold temperature is reached, if a determined temperature lies below the first threshold temperature and if, according to step a), reducing agent should be supplied, and selecting the first threshold temperature to permit hydrolysis in said hydrolysis catalytic converter to take place if the temperature lies above the first threshold temperature;

b.2) heating exhaust gas upstream of the exhaust gas treatment device with the heater until a second threshold temperature is reached, if the temperature lies below the second threshold temperature and if, according to step a), no reducing agent should be supplied, and selecting the second threshold temperature to permit a selective catalytic reduction of nitrogen oxide compounds in the SCR catalytic converter to take place if the temperature lies above the second threshold temperature, wherein the first threshold temperature is higher than the second threshold temperature; and c) supplying reducing agent if, according to step a), reducing agent should be supplied.

2. The method according to claim 1, which further comprises activating the heater only if the temperature and an exhaust-gas mass flow passing through the exhaust-gas treatment device lie in a range permitting at least the first threshold temperature or the second threshold temperature to be attained by using the heater.

3. The method according to claim 1, which further comprises:
firstly determining a quantity of reducing agent stored in the storage device; and
establishing in step a) that a supply of reducing agent should take place if the stored quantity of reducing agent lies below a minimum storage quantity.

4. The method according to claim 1, which further comprises:
selectively supplying reducing agent to the exhaust-gas treatment device in liquid or gaseous form with the at least one supply device;
additionally checking in step a) if the first threshold temperature can be attained by using the heater; and
providing a gaseous supply in step c) if the first threshold temperature cannot be reached.

5. The method according to claim 1, which further comprises:
specifying that a supply of reducing agent should take place if the temperature in the exhaust-gas treatment device exceeds a third threshold temperature.

6. The method according to claim 1, wherein a time segment during which a supply of reducing agent takes place amounts to at most 25% of an overall operating time of the internal combustion engine.

7. A motor vehicle, comprising:
an internal combustion engine; and
an exhaust-gas treatment device associated with said internal combustion engine and having a heater, a supply device for a reducing agent and a control unit; said control unit configured to carry out the method according to claim 1.

* * * * *